United States Patent [19]
Brown

[11] 3,966,159
[45] June 29, 1976

[54] SAFETY LATCH FOR TRAYS

[76] Inventor: Peter Brown, 2731 26th Ave., Oakland, Calif. 94601

[22] Filed: May 19, 1975

[21] Appl. No.: 578,507

[52] U.S. Cl. .............................. 248/250; 211/134
[51] Int. Cl.² ..................... A47G 29/02; E04G 3/08
[58] Field of Search ........... 108/152, 159; 211/134, 211/153, 126; 248/216, 229, 235, 250, 305, 306, 309, 311, 313, 316 R, 316 B; 24/248 R, 248 CR, 248 BC, 248 BJ, 248 SL, 249 R, 249 FP, 249 SL, 249 PP, 249 PC

[56] References Cited
UNITED STATES PATENTS

| 1,166,216 | 12/1915 | House .................................. 292/140 |
| 1,279,416 | 9/1918 | Osborne .............................. 248/250 |
| 2,883,137 | 4/1959 | Weber ................................ 248/243 |
| 3,020,013 | 2/1962 | Ochin et al. ............... 248/316 B UX |
| 3,285,559 | 11/1966 | Simon ................................. 248/313 |
| 3,558,090 | 1/1971 | Bird .................................... 248/309 |
| 3,792,829 | 2/1974 | Fickett ........................... 248/305 X |

FOREIGN PATENTS OR APPLICATIONS

| 41,553 | 1916 | Sweden .............................. 248/216 |
| 331,796 | 1958 | Switzerland ....................... 211/134 |
| 326,711 | 1930 | United Kingdom ................ 248/250 |

*Primary Examiner*—Roy D. Frazier
*Assistant Examiner*—Lawrence J. Staab
*Attorney, Agent, or Firm*—Robert H. Eckhoff

[57] ABSTRACT

A tray support is provided which can only be operated by application of a proper lifting force, thus preventing an invertent release of the tray such as by an earthquake or the like resulting in the objects on the tray being released with possible injury resulting to anyone adjacent the tray.

1 Claim, 3 Drawing Figures

SAFETY LATCH FOR TRAYS

SUMMARY OF THE INVENTION

It is in general the broad object of the present invention to provide a device for supporting heavy metal objects between vertical supports which support can be readily released as by the lifting motion applied by the forks of a fork lift truck.

Another object of the present invention is to provide a support for heavy metal objects on suitable vertical support members which can be released only upon adequate implementation by an independent and vertical lifting means.

DESCRIPTION OF THE PREFERRED EMBODIMENT

Figure 1:
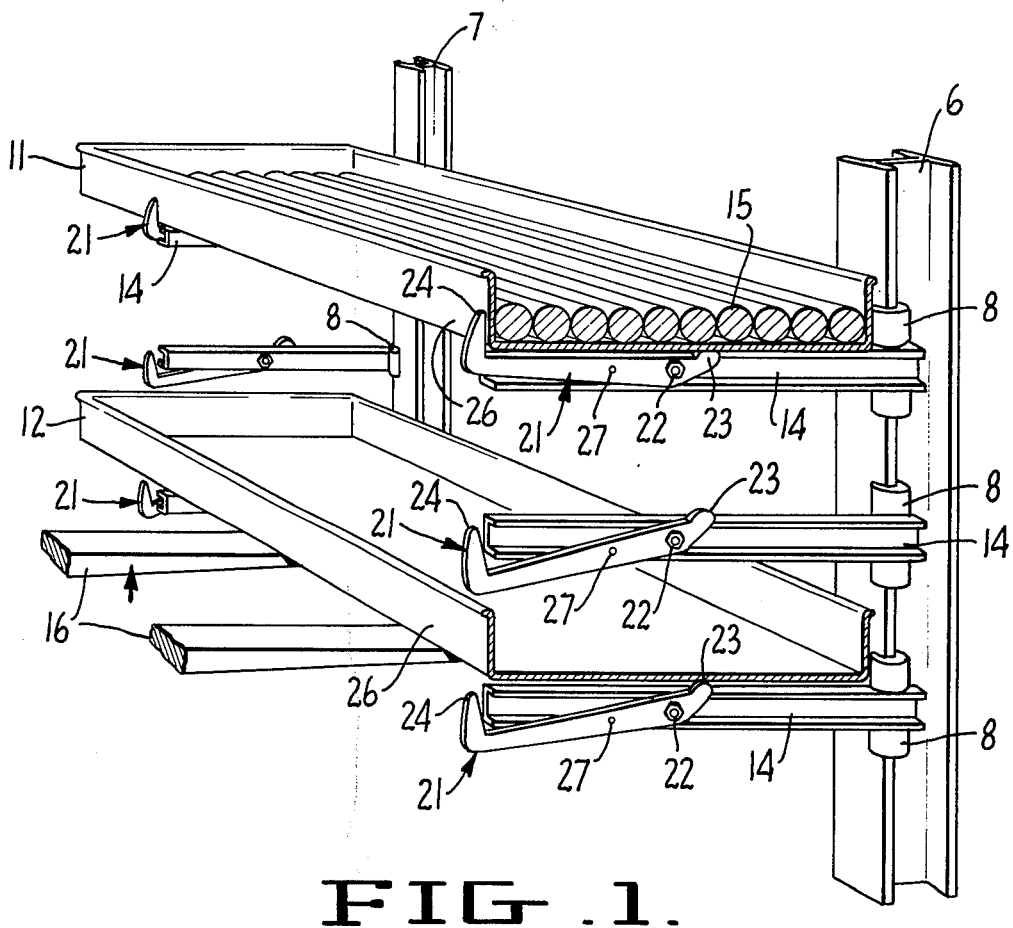
FIG. 1 is a perspective view illustrating the construction embodying the present invention and its mode of operation.
Figures 2, 3:
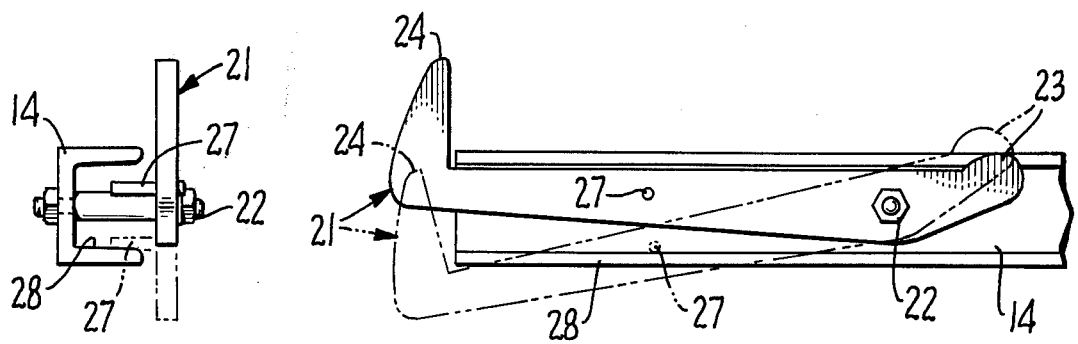
FIG. 2 is a diagrammatic view illustrating what occurs during the lifting motion applied by the lift mechanism of forks of a fork truck.
FIG. 3 is an end elevation of the structure shown in FIG. 2.

Referring to the accompanying drawings, spaced I-beam members 6 and 7 are provided as vertical supports to which attachment is made through suitable slidable devices 8, the construction of which is well-known in the art, which permit the space in between spaced trays 11 and 12, for example, to be regulated as desired. Each of the spaced trays is adapted to be lifted free from arms 14 attached to the supports 8 by means of the forks 16 as usually provided upon a fork lift truck. In FIG. 1 of the drawings, the righthand end of the upper tray has been omitted to show the placement of heavy objects such as bar stock 15, while the lowermost is shown as it is being lifted free of supports 14 by the forks 16 of a lift truck and the latches are free of the tray.

In accordance with this invention, means are provided for preventing a release movement of each of the trays 11 and 12, for example, by latch means 21. Each of the latch means 21 is pivoted as at 22 upon the horizontally extending arms 14, each latch means including a cam surface 23 at its rear end which is engaged with the under surface of one of the trays 11 and 12. At the forward end 24 of each latch means, an upwardly extending hook-like device is provided which engages the forward edge 26 of each tray. Further, in accordance with this invention, each latch means includes a pin 27 which, when a tray is lifted vertically by the forks 16, engages a flange surface 28 on one of the extending supporting arms 14 so that the latch will not interfere with the removal of the next lower tray.

From the foregoing, I believe it will be apparent that I have provided a novel and simple expedient for the latching of trays for heavy objects and which will prevent the trays from sliding from the racks. If it is desired to remove a tray, it is only necessary to lift the tray about an inch to an inch and a half with a fork lift truck and so relieve the latch and remove the tray. Pin 14 determines how far the latch can fall by coming to rest on the bottom wall of the main bracket. This prevents the latch from jamming the tray below.

I claim:

1. A device for retaining a tray in position on two spaced horizontal U-shaped supports, each support having a top leg and a bottom leg spaced from the top leg to define an opening therebetween, comprising:

a latching element pivotally attached to one of the horizontal supports, said latching element having an elongated body disposed in front of the opening in the U-shaped support, an upwardly projecting cam element on one end of said elongated body for engaging the undersurface of a tray supported on the top legs of the supports, a tray end engaging element on the other end of said elongated body having a flat face presented inwardly toward said elongated body and oriented perpendicularly thereof, said tray end engaging element projecting upwardly from said body a distance slightly less than the thickness of the tray for engaging a forward edge of the tray supported on the supports to prevent that tray from sliding forwardly when it is being supported on the supports, said flat face being perpendicularly disposed to the support top leg when the tray is supported on that top leg, a pivot pin extending through said elongated body to attach said body to the support so that it is located within the U-shaped support opening, said pivot pin being located near said body one end so that said pivot pin is spaced from said engaging element a distance which greatly exceeds that distance said pivot pin is spaced from said cam element; and a stop pin on said body between said engaging element and said pivot pin for engaging the support bottom leg so that when the tray is removed from engagement with said cam element said elongated body pivots about said pivot pin and said tray end engaging element moves downwardly to a position just below the support top leg so that the tray can move forwardly on the support top leg while said latching element is prevented from moving downwardly into a position whereat it would interfere with movement of trays on supports beneath said latching element.

* * * * *